US010912015B2

(12) United States Patent
Neeli et al.

(10) Patent No.: US 10,912,015 B2
(45) Date of Patent: Feb. 2, 2021

(54) EMBEDDING ARTIFICIAL INTELLIGENCE FOR BALANCING ACCESS POINT PROCESSING LOAD IN IPV6 ENABLED NETWORKS

(71) Applicant: Fortinet, Inc., Sunnyvale, CA (US)

(72) Inventors: Srinivasa Subbarao Neeli, Bangalore (IN); Sudheer Nagurla, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 41 days.

(21) Appl. No.: 16/454,070

(22) Filed: Jun. 27, 2019

(65) Prior Publication Data
US 2020/0413323 A1 Dec. 31, 2020

(51) Int. Cl.
*H04W 48/16* (2009.01)
*H04W 28/08* (2009.01)
*H04W 8/00* (2009.01)
*H04B 17/327* (2015.01)

(52) U.S. Cl.
CPC .......... *H04W 48/16* (2013.01); *H04B 17/327* (2015.01); *H04W 8/005* (2013.01); *H04W 28/08* (2013.01)

(58) Field of Classification Search
None
See application file for complete search history.

(56) References Cited

U.S. PATENT DOCUMENTS

| | | | | |
|---|---|---|---|---|
| 9,860,688 B2* | 1/2018 | Kulkarni | ............... | H04W 84/18 |
| 2007/0115906 A1* | 5/2007 | Gao | ......... | G06F 30/33 |
| | | | | 370/338 |
| 2009/0011795 A1* | 1/2009 | Fukui | .................. | H04J 11/0093 |
| | | | | 455/561 |
| 2012/0020339 A1* | 1/2012 | Lai | ......... | H04W 48/20 |
| | | | | 370/338 |
| 2013/0281090 A1* | 10/2013 | Maeda | ................. | H04W 48/02 |
| | | | | 455/434 |
| 2014/0016586 A1* | 1/2014 | Khan | .................... | H04L 1/0003 |
| | | | | 370/329 |
| 2014/0098670 A1* | 4/2014 | Choi | .................... | H04W 28/08 |
| | | | | 370/235 |
| 2014/0269322 A1* | 9/2014 | Li | ......... | H04W 28/08 |
| | | | | 370/236 |
| 2015/0334598 A1* | 11/2015 | Duo | ...................... | H04W 24/02 |
| | | | | 370/338 |

(Continued)

Primary Examiner — Chi H Pham
Assistant Examiner — Vladislav Y Agureyev
(74) Attorney, Agent, or Firm — Law Office of Dorian Cartwright; Dorian Cartwright

(57) ABSTRACT

Responsive to a CPU load of a specific access point surpassing a high CPU threshold value, each of the wireless stations is disassociated from the specific access point. A second access point within range of the disassociated wireless stations is identified. A current CPU load is determined for the second access point and determining RSSI values for the wireless station with respect to the second access points relative to other available access points. Responsive to a current CPU load being within a low CPU threshold value, and an RSSI value being within a minimum decibel value, one or more of the disassociated wireless stations the second access point are associated. IPv6 network services are then continued for the wireless station by the second access point.

2 Claims, 4 Drawing Sheets

(56) References Cited

U.S. PATENT DOCUMENTS

| | | | |
|---|---|---|---|
| 2016/0043844 A1* | 2/2016 | Meylan | H04L 5/0048 |
| | | | 370/315 |
| 2017/0142613 A1* | 5/2017 | Singh | H04W 28/08 |
| 2017/0223718 A1* | 8/2017 | Zhong | H04L 43/16 |
| 2017/0374493 A1* | 12/2017 | Pereira Cabral | H04W 4/70 |
| 2018/0324218 A1* | 11/2018 | Xie | H04W 24/02 |
| 2019/0053107 A1* | 2/2019 | Fu | H04W 36/165 |
| 2019/0320385 A1* | 10/2019 | Bhartia | H04W 48/06 |
| 2020/0128440 A1* | 4/2020 | Srinivasamurthy | |
| | | | H04W 28/0215 |

\* cited by examiner

EMBEDDING ARTIFICIAL INTELLIGENCE FOR BALANCING ACCESS POINT PROCESSING LOAD IN IPV6 ENABLED NETWORKS

FIELD OF THE INVENTION

The invention relates generally to computer networking, and more specifically, to embedding artificial intelligence for balancing access point processing load in IPv6 enabled networks.

BACKGROUND

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in wireless devices such as laptop computers, tablet computers, smart phones, and network appliances. Many networks with wireless devices use an access point (AP) with a radio and antenna as an interface between wireless devices and the backbone network which is typically wired. Wireless devices can discover available APs within range of their radios by listening for beacons broadcast by APs which include an identifier such as a basic service set identifier (BSSID). Wireless device use the identifier in a probe request to initiate a connection to the identified AP.

One new protocol causing high CPU usage on network devices is IPv6. Compared to IPv4 with 32-bit addresses, the 128-bit addresses of IPv6 add to the computational load required for processing network packets in access points.

What is needed is a robust technique to load balancing IPv6 enabled access nhpoints to protect CPU loads in access points.

SUMMARY

To meet the above-described needs, methods, computer program products, and systems for load balancing.

In one embodiment, a list of wireless stations that are IPv6 capable is compiled. A list of wireless stations within range of each access point is also generated. A CPU load of each of the access points having IPv6 network services enabled is monitored. Additionally, list of RSSI values for each wireless station with respect to each access point within range. The RSSI values can be derived from probe requests received by each of the access points and measured during a receipt transmission and forwarded to the controller;

In an embodiment, and responsive to a CPU load of a specific access point surpassing a high CPU threshold value, each of the wireless stations is disassociated from the specific access point. A second access point within range of the disassociated wireless stations is identified. A current CPU load is determined for the second access point and determining RSSI values for the wireless station with respect to the second access points relative to other available access points. Responsive to a current CPU load being within a low CPU threshold value, and an RSSI value being within a minimum decibel value, one or more of the disassociated wireless stations the second access point are associated. IPv6 network services are then continued for the wireless station by the second access point.

Advantageously, network performance is improved for networks with increasing CPU loads from IPv6 wireless stations.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for preventing connections to unauthorized access points with channel switch announcements.

Figure 1:
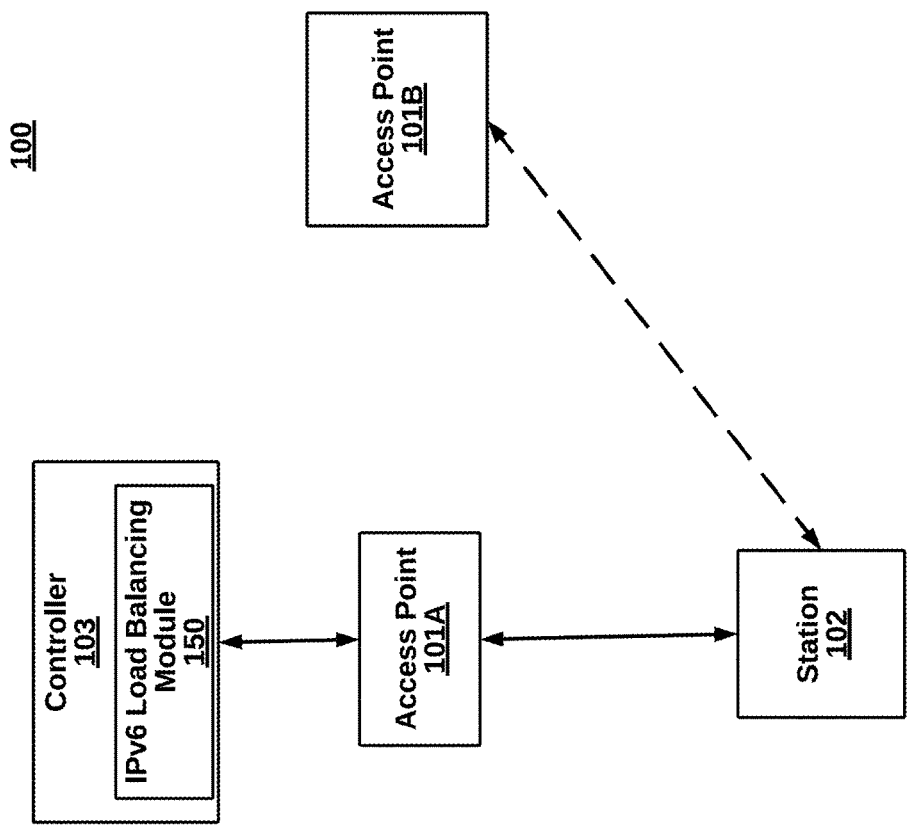
FIG. 1 is a high-level block diagram illustrating a system for CPU load balancing of IPv6 clients on access points with IPv6 capability, according to one embodiment.
Figure 3:
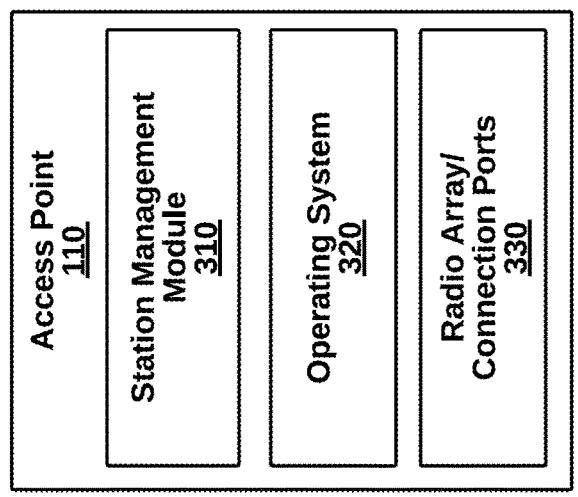
FIG. 3 is a more detailed block diagram illustrating an access point of the system of FIG. 1, according to one embodiment.
Figure 2:
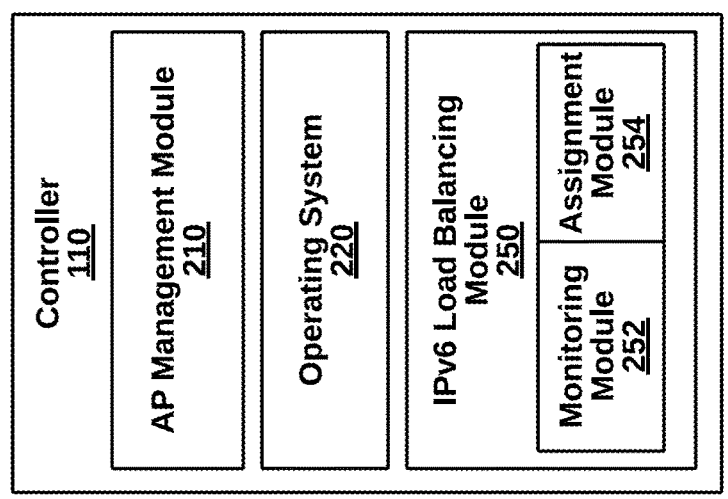
FIG. 2 is a more detailed block diagram illustrating a controller of the system of FIG. 1, according to one embodiment.

Systems for CPU Load Balancing of IPv6 Stations (FIGS. 1-3)

FIG. 1 is a high-level block diagram illustrating a system for CPU load balancing of IPv6 stations on access points with IPv6 capability, according to one embodiment. The system 100 includes APs 101A and B, a station 102 and a controller 103 coupled in communication through a data communication network. Other embodiments of the system 100 can include additional network components that are not shown in FIG. 1. For example, there can be more APs and more stations. There can also be network devices such as switches, routers, fire walls, proxy servers, and the like.

An IPv6 balancing module 150 of the controller 103 relocates IPv6 clients until a CPU load equilibrium is reached. Triggered by a CPU load over a maximum threshold value, IPv6 stations are disassociated from an access point to relieve CPU and then reassociated at other able access points. In some embodiments, the IPv6 load balancing operates separate from and in addition to other balancing schemes, triggered by conditions other than CPU usage. The controller 103 is discussed in more detail below with respect to FIG. 2.

In more detail, a monitoring module 252 tracks what stations can be seen by different access points. The RSSI strength in decibels is also tracked. For example, at −65 dB, a stations may be inclined to roam to a station with a minimum connection strength of −45 dB. An assignment module 254 deassociates IPv6 clients from an access point over its CPU maximum threshold. The thresholds can be uniform, or specific per access point. Thresholds can be dynamically changed automatically as conditions in the network change. The assignment module 254 also selects an access point for the disassociated stations to associate with.

To do so, an SSID and MAC address are sent to the responsive access point for communicating with the station.

One example algorithm is triggered when the CPU maximum load of one of the access points is detected as above 70%. To avoid deteriorating network service, clients can be moved around and reassociated. For example, the assignment module 254 may first search for an access point with less than 45% CPU usage for reassociation, and a minimum of 55 dB connection strength with a particular IPv6 client. A next level can be 55% CPU usage and a minimum of 50 dB. One of ordinary skill in the art will recognize that these examples are non-limiting and can be customized for individual deployments.

The APs 101A and B provide IPv6 services to capable client. For a Cisco WAP121 or WAP321 type access point, a configuration utility provides a checkbox for activating IPv6 addresses as either DHCPv6 or static IPv6.

Figure 6:
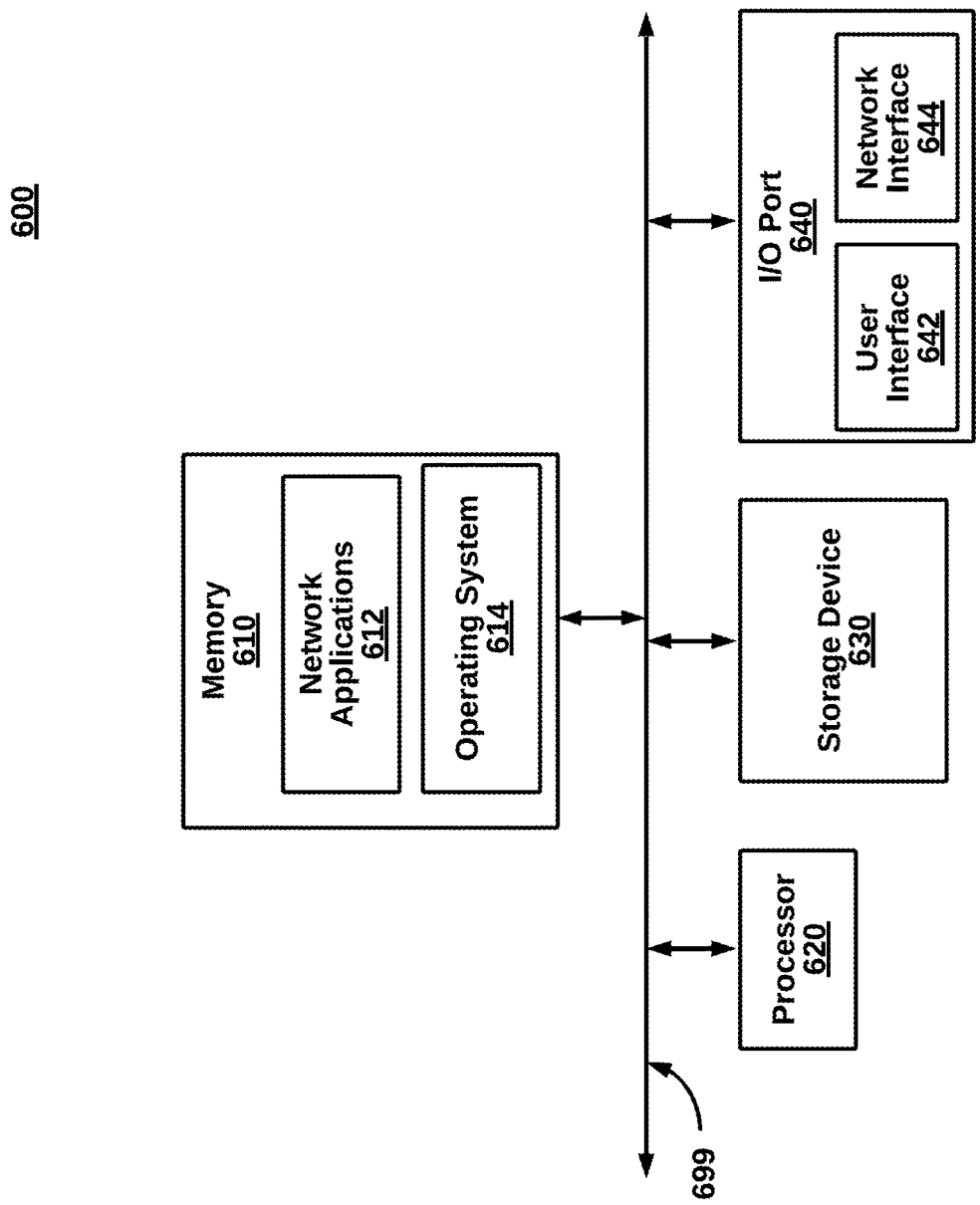
FIG. 6 is a block diagram illustrating an exemplary computing device, according to one embodiment.

The AP 101 can be any of the computing devices, such as a personal computer, a server blade, any computing environment as shown in FIG. 6. For example, the AP 101 can be an Access Point—Model 101 or an Access Point—Model 433 (modified as discussed herein) by Meru Networks of Sunnyvale, Calif., now Fortinet, Inc. The AP 101 is preferably connected to the network 150 (or to a switch, router, hub, or another AP that is connected to the network 150) via a wired or wireless connection. The AP 101 can be set-up in various configurations with other APs to provide wireless coverage areas. In one embodiment, the functionality is incorporated into a switch or router, and in another embodiment, is incorporated into a custom enclosure. In operation, the AP 101 transmits network packets to and from station 102.

The station (or mobile station, STA, client or wireless device) 102 can be, for example, a personal computer, laptop computer, tablet computer, smart phone, mobile computing device, Internet appliance, end station or any other computing device as described in FIG. 6. Station 102 is wirelessly couples to APs using a radio and antenna. No pre-configuration or client is needed. The station 102 operates according to wireless standards such as IEEE 802.11a, b, g, n, ac, w or any other wireless standard. The station 102 sends and/or receives network packets for applications being executed. Embodiments of the station 102 are discussed in more detail below in association with FIG. 3.

FIG. 2 is a more detailed block diagram illustrating the controller 103 of the system of FIG. 1, according to one embodiment. The controller 103 includes an AP management module 210, an operating system 220, and a radio array/connection ports 230. The components can be implemented in hardware, software, or a combination of both.

The AP management module 210 registers access points that are under management by the controller 103. MAC addresses of individual stations can also be stored by the controller 103 to maintain uniform treatment of wireless stations as they move around the network to different access points.

FIG. 3 is a more detailed block diagram illustrating the AP 101 of the system of FIG. 1, according to one embodiment. The AP 101 includes a station management module 310, an operating system 320, and a radio array/connection ports 330. The components can be implemented in hardware, software, or a combination of both. One example of hardware is processors that process network packets. The processors can be general purpose processors or specialized network processors.

The station management module 210 manages station connections by advertising beacons, receiving probe request, sending probe responses and other management frames. Further, individual stations can be tracked as to bandwidth usage, QoS, BSSID assignment, and the like. Beacons and probe responses can also be modified by the station management module 112 to include channel switch announcement information The operating system 220 interfaces between the software and hardware of the AP 101. The operating system 114 can also include integrated applications. The operating system 114 can handle connections to stations by sending out beacons.

The radio array 230 includes one or more transmit (Tx) and receive (Rx) antennas and electronics (e.g., encoders/decoders) for communication with the physical layer.

Figure 4:
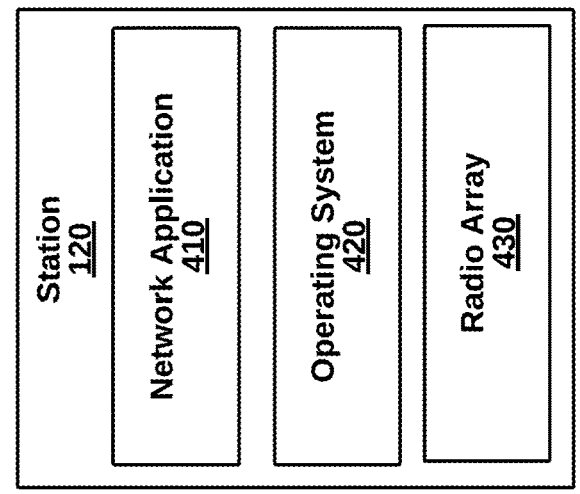
FIG. 4 is a more detailed block diagram illustrating a station of the system of FIG. 1, according to one embodiment.

FIG. 4 is a more detailed block diagram illustrating a station 102 of the system of FIG. 1, according to one embodiment. The station 102 comprises a network application 410, an operating system 420, and a radio array 430. The components can be implemented in hardware, software, or a combination of both.

The network application 410 can be any application executing on the station 102 that makes use of network access in operation. Examples of the network application 410 include a network browser, a VOIP telephone service, a streaming video player, a database viewer, a VPN client, and the like.

The operating system 420 is responsible for connecting to a communication channel for data exchange, among other tasks. To do so, the operating system 420 listens for beacons broadcast by APs, and generates a probe request to connect to a selected AP. After connecting, the operating system 124 exchanges data packs and unpacks data packets in accordance with, e.g., a TCP/IP stack. More particularly, IEEE 802.11-type packets (e.g., IEEE 802.11ac packets) can be generated and received.

The radio array 430 includes one or more transmit (Tx) and receive (Rx) antennas and electronics (e.g., encoders/decoders) for communication with the physical layer.

Figure 5:
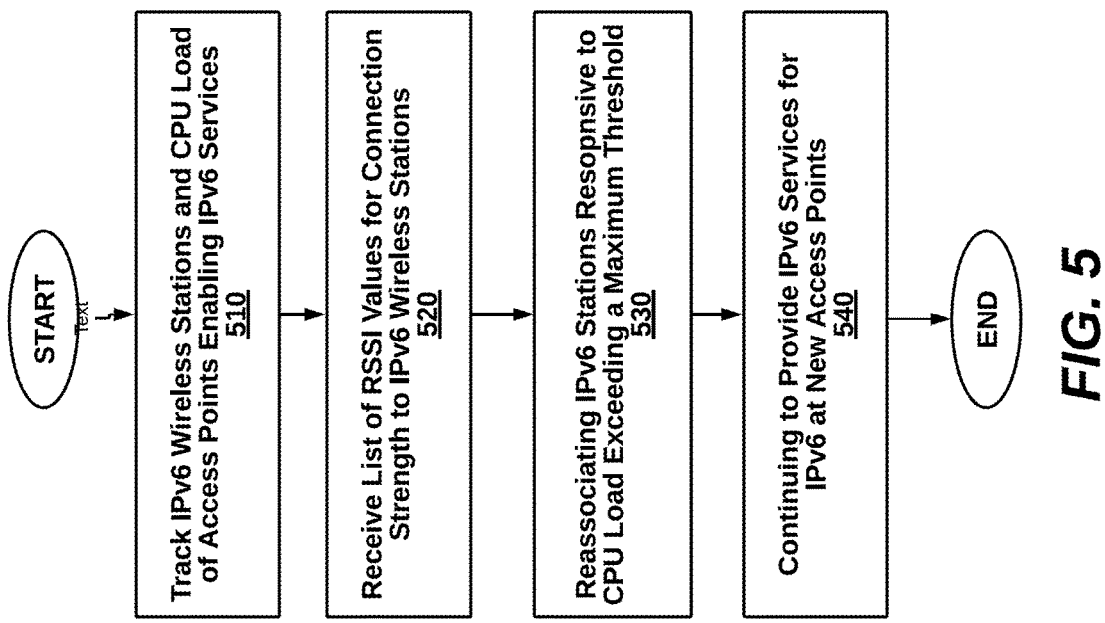
FIG. 5 is a high-level flow diagram illustrating a method for CPU load balancing of IPv6 stations on access points with IPv6 capability, according to one embodiment.

Methods for CPU Load Balancing of IPv6 Stations (FIGS. 4-5)

FIG. 5 is a high-level flow diagram illustrating a method 600 for preventing connections to unauthorized access points with channel switch announcements, according to one embodiment. The method 500 can be implemented by, for example, the controller 103 of FIG. 1. Many other variations are possible.

At step 510, IPv6 wireless stations are tracked. The total number is tracked and the load on the network as well. A station can be tracked individually as it moves around a network. The CPU loads for each of the access points is also tracked. The load can be a percentage of full utilization, such as 25%, 50% or 75%. Other scales can also be substituted.

At step 520, a list of RSSI values is received. The RSSI value can be a representation in decibels of the connection strength between a station and an access point. When probe request are received, a measurement is taken and compared to a strength at which the packet was transmitted.

At step 530, IPv6 stations are kicked off the current access point and reassociated to a preferred access point. At step 540, the network continues providing services with IPv6 stations at new access points.

Generic Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, including the AP 1-1, and the mobile station 102 and the controller 103. Additionally, the computing device 600 is merely an example implementation itself, since the system 100 can also be fully or partially implemented with laptop computers, tablet computers, smart cell phones, Internet appliances, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network applications 612 and an operating system 614. The network applications 620 can include the modules of network applications or APs as illustrated in FIGS. 2-4. Other network applications can include 612 a web browser, a mobile application, an application that uses networking, a remote application executing locally, a network protocol application, a network management application, a network routing application, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 830.

The storage device 630 can be any non-volatile type of storage such as a magnetic disc, EEPROM, Flash, or the like. The storage device 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a controller of a data communication network managing a plurality of access points coupled to a wireless network for balancing IPv6 clients, the method comprising:

compiling a list of wireless stations that are IPv6 capable and a list of wireless stations within range of each access point;

tracking a CPU load of each of the access points having IPv6 network services enabled;

receiving a list of RSSI values for each wireless station with respect to each access point within range, the RSSI values derived from probe requests received by each of the access points and measured during a receipt transmission and forwarded to the controller;

responsive to a CPU load of a specific access point surpassing a high CPU threshold value, disassociating each of the wireless stations from the specific access point;

identifying a second access point within range of the disassociated wireless stations and determining a current CPU load for the second access point and determining RSSI values for the wireless station with respect to the second access points relative to other available access points;

responsive to a current CPU load being within a low CPU threshold value, and an RSSI value being within a minimum decibel value, associating one or more of the disassociated wireless stations the second access point; and continuing IPv6 network services for the wireless station by the second access point.

2. A non-transitory computer-readable medium storing instructions that, when executed by a processor, perform a computer-implemented method in a controller of a data communication network managing a plurality of access points coupled to a wireless network for balancing IPv6 clients, the method comprising compiling a list of wireless stations that are IPv6 capable and a list of wireless stations within range of each access point;

tracking a CPU load of each of the access points having IPv6 network services enabled;

receiving a list of RSSI values for each wireless station with respect to each access point within range, the RSSI values derived from probe requests received by each of the access points and measured during a receipt transmission and forwarded to the controller;

responsive to a CPU load of a specific access point surpassing a high CPU threshold value, disassociating each of the wireless stations from the specific access point;

identifying a second access point within range of the disassociated wireless stations and determining a current CPU load for the second access point and determining RSSI values for the wireless station with respect to the second access points relative to other available access points;

responsive to a current CPU load being within a low CPU threshold value, and an RSSI value being within a minimum decibel value, associating one or more of the disassociated wireless stations the second access point; and continuing IPv6 network services for the wireless station by the second access point.

* * * * *